US011006664B2

(12) United States Patent
Tang et al.

(10) Patent No.: US 11,006,664 B2
(45) Date of Patent: May 18, 2021

(54) GRAPHENE ADSORBING MATERIAL, PREPARATION METHOD THEREFOR AND APPLICATION THEREOF, AND CIGARETTE FILTER TIP AND CIGARETTE

(71) Applicant: Jinan Shengquan Group Share Holding Co., Ltd., Zhangqiu (CN)

(72) Inventors: Yilin Tang, Zhangqiu (CN); Jinzhu Zhang, Zhangqiu (CN); An Zhang, Zhangqiu (CN); Ding Liu, Zhangqiu (CN)

(73) Assignee: JINAN SHENGQUAN GROUP SHARE HOLDING CO., LTD., Zhangqiu (CN)

( * ) Notice: Subject to any disclaimer, the term of this patent is extended or adjusted under 35 U.S.C. 154(b) by 406 days.

(21) Appl. No.: 15/751,700

(22) PCT Filed: Jul. 25, 2016

(86) PCT No.: PCT/CN2016/091497
§ 371 (c)(1),
(2) Date: Feb. 9, 2018

(87) PCT Pub. No.: WO2017/024933
PCT Pub. Date: Feb. 16, 2017

(65) Prior Publication Data
US 2018/0228209 A1    Aug. 16, 2018

(30) Foreign Application Priority Data

Aug. 9, 2015  (CN) .......................... 201510480438.9
Aug. 9, 2015  (CN) .......................... 201510480439.3
Dec. 31, 2015  (CN) .......................... 201511033211.6

(51) Int. Cl.
*A24D 3/16*     (2006.01)
*B01J 20/20*    (2006.01)
(Continued)

(52) U.S. Cl.
CPC ............. *A24D 3/163* (2013.01); *A24D 1/045* (2013.01); *A24D 3/16* (2013.01); *B01D 53/02* (2013.01);
(Continued)

(58) Field of Classification Search
CPC .. A24D 3/16–163; A24D 1/045; A24D 3/048; A24D 3/163; A24D 3/166;
(Continued)

(56) References Cited

U.S. PATENT DOCUMENTS

2015/0133568 A1   5/2015  Zhao et al.
2015/0221409 A1   8/2015  Wu et al.
(Continued)

FOREIGN PATENT DOCUMENTS

CN   103005712 A  *  4/2013
CN   103005712 A      4/2013
(Continued)

OTHER PUBLICATIONS

"CN103005712_Machine Translation" is a machine translation of CN-103005712-A. (Year: 2013).*
(Continued)

*Primary Examiner* — Laura C Powers
*Assistant Examiner* — Larissa Rowe Emrich
(74) *Attorney, Agent, or Firm* — Lathrop GPM LLP

(57) ABSTRACT

A graphene adsorbing material, a preparation method therefor and application thereof, and a cigarette filter tip and a cigarette are provided. The graphene adsorbing material comprises a fiber carrier, graphene and doped elements wherein the graphene and the doped elements are loaded on the fiber carrier and the doped elements comprise at least one of Al, Si and Fe. The graphene adsorbing material is obtained by contacting the fibers with the graphene material to load the graphene material on the fibers. By introducing (Continued)

the graphene and the doped elements in the fiber carrier, harmful substances with a type of fused aromatic hydrocarbons such as benzopyrene in smoke can be specifically adsorbed, filtered and removed; while nicotine and the other harmless substances are retained, and thus the smoking taste of a cigarette is not affected. The cigarette filter tip can effectively adsorb cancerogenic substances with a type of fused aromatic hydrocarbons such as benzopyrene in smoke to reduce harm of smoking; meanwhile, the pleasure of smoking and the mellow taste of the smoke are not affected. Besides, the graphene adsorbing material can also prevent the phenomenon that a cigarette holder gets mildewed due to humid environment and the other factors.

15 Claims, 2 Drawing Sheets

(51) Int. Cl.

| | | |
|---|---|---|
| *A24D 1/04* | (2006.01) | |
| *B01D 53/02* | (2006.01) | |
| *B01J 20/28* | (2006.01) | |
| *B01J 20/30* | (2006.01) | |
| *B01J 20/32* | (2006.01) | |
| *F01N 3/08* | (2006.01) | |
| *F24F 8/10* | (2021.01) | |
| *F24F 3/16* | (2021.01) | |
| *F24F 8/97* | (2021.01) | |

(52) U.S. Cl.
CPC ............. *B01J 20/20* (2013.01); *B01J 20/205* (2013.01); *B01J 20/28023* (2013.01); *B01J 20/28054* (2013.01); *B01J 20/3071* (2013.01); *B01J 20/324* (2013.01); *B01J 20/3212* (2013.01); *B01J 20/3293* (2013.01); *F01N 3/0828* (2013.01); *F24F 8/10* (2021.01); *B01D 2253/102* (2013.01); *B01D 2257/502* (2013.01); *B01D 2257/7027* (2013.01); *F24F 8/97* (2021.01)

(58) Field of Classification Search
CPC ............ A24D 3/06–166; B01J 20/0222; B01J 20/0225; B01J 20/0229; B01J 20/0248; B01J 20/0251; B01J 20/048; B01J 20/20; B01J 20/28028; B01J 20/28054; B01J 20/28088–28092; B01J 20/205; B01J 20/28023; B01J 20/3212; B01J 20/324; B01D 39/08–086; B01D 39/16–163; B01D 39/18; B01D 39/2055–2065; B01D 53/02; B01D 53/04
USPC .................................................. 131/331–346
See application file for complete search history.

(56) References Cited

U.S. PATENT DOCUMENTS

| | | | |
|---|---|---|---|
| 2015/0306550 A1* | 10/2015 | Lee .................... | B01D 67/0062 210/500.21 |
| 2017/0051078 A1* | 2/2017 | Tang .................... | C01B 32/184 |

FOREIGN PATENT DOCUMENTS

| | | | | |
|---|---|---|---|---|
| CN | 104226267 A | * | 12/2014 | |
| CN | 104226267 A | | 12/2014 | |
| CN | 104328523 A | * | 2/2015 | .............. D01F 2/08 |
| CN | 104489922 A | | 4/2015 | |
| CN | 104724699 A | | 6/2015 | |
| CN | 104815630 A | | 8/2015 | |
| CN | 105054291 A | | 11/2015 | |
| CN | 105054293 A | | 11/2015 | |
| CN | 204812019 U | | 12/2015 | |
| CN | 204888717 U | | 12/2015 | |
| CN | 105525381 A | | 4/2016 | |
| CN | 105597675 A | | 5/2016 | |
| EP | 3266743 A1 | | 1/2018 | |

OTHER PUBLICATIONS

"CN104226267_Machine Translation" is a machine translation of CN-104226267-A. (Year: 2014).*
Chinese Patent Application No. CN201610591211.6; Notification of Grant of Right of Invention dated Aug. 5, 2019; Including English Translation; 6 pgs.
International Search Report and Written Opinion corresponding to PCT International Patent Application No. PCT/CN2016/091497 completed Oct. 17, 2016 (includes English translation of the International Search Report).

* cited by examiner

GRAPHENE ADSORBING MATERIAL, PREPARATION METHOD THEREFOR AND APPLICATION THEREOF, AND CIGARETTE FILTER TIP AND CIGARETTE

CROSS-REFERENCE TO RELATED APPLICATIONS

This application is a U.S. National Stage Application filed under 35 U.S.C. § 371 of International Application No. PCT/CN2016/091497, filed Jul. 25, 2016, which claims the benefit of Chinese Application Nos. CN 201510480438.9, filed on Aug. 9, 2015; CN 201510480439.3, filed on Aug. 9, 2015; and CN 201511033211.6, filed on Dec. 31, 2015. All of these applications are hereby incorporated by reference in their entireties.

TECHNICAL FIELD

The present disclosure relates to the technical field of adsorption, and in particular to a graphene adsorbing material, a preparation method therefor and an application thereof, and a cigarette filter tip and a cigarette.

BACKGROUND ART

During the combustion of a cigarette (or rolling tobacco), harmful constituents like CO, phenol and fused polycyclic aromatic hydrocarbons such as benzopyrene, etc. are generated, which enter a human body with smoke gas during smoking and cause harm to the human body. A filter tip, an upper portion of the rolling tobacco, is a bridge between cigarette mainstream smoke and the human body, mainly used to filter out a part of harmful substances such as tar in the inhaled smoke gas, to reduce the harm of smoking to the human body. In order to achieve the required function, the rolling tobacco filter tip gradually develops from an ordinary filter tip of single cellulose acetate fibers to a multi-filter tip, as well as a filter tip made of a variety of materials.

The general process of inhalation of toxic substances into the human body during smoking is as follows: the toxic substances are distributed substantially uniformly in the tobacco, most of the tobacco lighted during smoking is converted into smoke, the toxic substances are partially carried by the smoke to go directly into the air, and partially travel along the cigarette. During the traveling, the toxic substances are absorbed by a part of the unlighted tobacco and the filter tip and deposited, and the rest enters the human body. The toxic substances, that are absorbed by the tobacco and deposited, partially go into the air when tobacco absorbing the toxic substance is burned, and partially travel along the cigarette, and this process is continued until burning of the cigarette reaches the filter tip. Then it can be seen that the toxic substances that are originally distributed in the tobacco are all inhaled by the human body, except the part that goes into the air and is absorbed by the filter tip. The actual process of smoking is very complex and varies from person to person. The ratio of the amount of the toxic substances lighted that goes into the air with smoke to the amount of the toxic substances that travels along the cigarette is related to a variety of factors such as the way of smoking, the environment and so on; the speed at which smoke travels along the cigarette varies continuously with the smoking action; and the absorption of the toxic substances by the filter tip and tobacco will also vary with the factors such as the speed of travelling with smoke.

The prior art discloses a variety of rolling tobacco filter tips. For example, Chinese patent document with Grant No. CN 2872872Y discloses an expanded graphite composite type cigarette filter tip which is composed of a filtration fiber section, an expanded graphite section and wrapping paper, wherein the filtration fiber section is in butt connection with the expanded graphite filtration section, and the wrapping paper is wrapped around the two sections. In the solution of this application, a filtration section containing expanded graphite is added to the cigarette filter tip to prepare an expanded graphite composite type filter tip, which can effectively filter out harmful substances such as nicotine gas, kerosene and nicotine from cigarette smoke, but cannot adsorb benzopyrene.

Chinese patent document with publication No. CN 104815630 A discloses a method of preparing filter tip fibers for selectively adsorbing benzopyrene and phenol, in which method, a graphene oxide aqueous solution or a mixed solution of graphene oxide and a chitosan aqueous solution is mainly used as a specific modifier with which the fibers are treated (for example sprayed, etc.), the treatment time is 5~20 minutes, and the treatment temperature is 25~50° C., and then the treated fibers are placed in a vacuum condition at 80° C. and dried for 6 hours to give filter tip fibers treated with the modifier. In this application, the resulting filter fibers are used to prepare a cigarette filter tip, which can reduce the benzopyrene content in the smoke, but on one hand, this application relates to other additives such as chitosan and the preparation process is cumbersome, and on the other hand its effect of adsorption of benzopyrene still needs to be improved.

In addition, Chinese Patent CN202525068U describes a cigarette filtering material made of a fluoroplastic electret material, which is brought into direct contact with the tail of a cigarette. Due to the high temperature of smoke of the cigarette, the fluoroplastic electret will be decomposed, when in contact with the high-temperature smoke, to generate gases harmful to the human body. Moreover, Chinese Patent CN103919280A describes a cigarette filter tip, wherein a polypropylene electret filtering layer is arranged in the cigarette filter tip, so that 90% or more of smoke particulate pollutants are reduced, and then a non-photocatalyst filtering layer is arranged in the cigarette filter tip, so that harmful substances in the smoke, such as nicotine, nitrosamine and benzopyrene, are effectively reduced, and damage to the human body during smoking is reduced, but in this technical solution, the polypropylene electret filtering layer will be decomposed, when in contact with the high-temperature smoke, to generate gases harmful to the human body.

From the current state of the art, the existing filter tips still have the problems of poor filtration effect and low filtration efficiency. Therefore, how to further improve the adsorption capacity of the cigarette filter tip is a problem that needs to be solved urgently for addressing the harm of cigarettes to health.

SUMMARY

In order to solve the above problems in the prior art, the present disclosure provides a graphene adsorbing material, a preparation method and use thereof, and a cigarette filter tip and a cigarette. The cigarette filter tip and the cigarette provided according to the present disclosure are capable of retaining nicotine and other harmless substances in smoke while selectively adsorbing and filtering out fused polycyclic aromatic hydrocarbon substances such as benzopyrene from the smoke, and thereby not affecting the smoking taste of the smoke.

In one aspect, the present disclosure provides a graphene adsorbing material, comprising:

a fiber carrier; and graphene and a doped element which are loaded on the fiber carrier, the doped element comprising at least one of Al, Si and Fe, that is, the doped element (mineral element) comprising one or several of Al, Si and Fe.

Preferably, the graphene and the doped element are introduced by biomass-derived graphene.

Optionally, the fiber carrier comprises at least one of natural fibers, semi-synthetic fibers and synthetic fibers, that is, the fiber carrier comprises one or several of natural fibers, semi-synthetic fibers and synthetic fibers.

Optionally, the content of the graphene is 0.1~10 wt % of the weight of the fiber carrier.

Preferably, the graphene has a porous structure with a porosity of 2%~10%. The expression "graphene has a porous structure" means that there is a porous distributed structure in the graphene sheet plane.

Optionally, the content of the doped element is 0.002~1 wt % of the weight of the fiber carrier.

Further, the doped element further comprises at least one of K, Na, Ca, Mg, P, Mn, and Co, that is, the doped element further comprises one or several of K, Na, Ca, Mg, P, Mn, and Co.

Another aspect of the present disclosure provides a method of preparing a graphene adsorbing material described above, comprising the steps of:

bringing fibers into contact with a graphene material for loading, so that the graphene material is loaded on the fibers, thereby obtaining the graphene adsorbing material, the graphene material comprising graphene and a doped element, the doped element comprising at least one of Al, Si and Fe (i.e., the doped element comprising one or several of Al, Si and Fe).

Further, the above preparation method provided by the present disclosure specifically comprises the steps of:

dispersing the graphene material in a solvent to prepare a graphene solution (i.e., the graphene solution is prepared by dispersing the graphene material in a solvent), wherein the graphene material is introduced by biomass-derived graphene (or the graphene material is porous biomass-derived graphene), preferably, the solvent comprises at least one of ethylene glycol, dimethylformamide, N-methylpyrrolidone, ethanol and water. Preferably, a coupling agent is also dissolved in the graphene solution, and further preferably, the coupling agent comprises at least one of a silane coupling agent, a titanate coupling agent, and a zirconium-based coupling agent. The amount of the coupling agent used is 1%~10% of the amount of the graphene used; and immersing the fibers in the graphene solution for 10~60 min, and washing and drying the fibers to obtain the graphene adsorbing material.

A further aspect of the present disclosure provides use of the above graphene adsorbing material provided by the present disclosure or a graphene adsorbing material prepared according to the above preparation method provided by the present disclosure in smoke filtration. Preferably, a device for the filtration of smoke including a cigarette filter tip, an air conditioning filter element or a vehicle exhaust emission device (i.e., a device for smoke filtration including a rolling tobacco filter tip, an air conditioning filter element or a vehicle exhaust emission device.

A still further aspect of the present disclosure provides a cigarette filter tip (or rolling tobacco filter tip), which comprises a fiber section made of the above graphene adsorbing material provided by the present disclosure.

A still further aspect of the present disclosure provides a cigarette filter tip, comprising a cigarette-filter-tip housing and a filter element, wherein the cigarette-filter-tip housing is preferably molded (or cast-molded) from food-grade plastic, the cigarette-filter-tip housing comprises a cigarette holder region, a filtration region and a cigarette interface region, the filter element, which is arranged tightly in the filtration region, comprises a graphene adsorption section, and preferably the filter element is cylindrical and is in close contact with an inner wall of the filtration region of the cigarette-filter-tip housing.

Preferably, the filter element further comprises a fiber filtration section, wherein the fiber filtration section is close to the cigarette holder region, and the graphene adsorption section is close to the cigarette interface region, and preferably, the fiber filtration section has a length of 20~40 mm, and the graphene adsorption section has a length of 15~30 mm.

That is, the filter element is provided in the filtration region, with the filter element having a fiber filtration section and a graphene adsorption section sequentially from an upper end of the cigarette holder region to an initial end of the cigarette interface region, and the filter element is seamlessly embedded in the filtration region, the fiber filtration section of the filter element has a length of 20~40 mm, and the graphene coated adsorption section of the filter element has a length of 15~30 mm.

Further, the graphene adsorption section is coated with modified graphene, wherein the graphene is bonded by chemical bonds to and firmly bonded to filtration fibers (i.e., graphene coated on the graphene adsorption section has been subjected to modification, so that the graphene is bonded to the filtration fibers by chemical bonds, and the graphene is firmly bonded to the filtration fibers).

Preferably, the graphene adsorption section comprises the above graphene adsorbing material provided by the present disclosure.

Further, the cigarette holder region and the cigarette interface region are connected with the filtration region by threads, respectively, such that according to the contamination degree of the filter element in the filtration region, the filtration region is able to be opened for replacement of the filter element. Preferably, the housing at the cigarette holder region is oblate or circular, and the cigarette holder region is provided at center with a vent tube, and preferably, the vent tube has a diameter of 1~3 mm.

The present disclosure also provides a cigarette, comprising: a filter tip and cut cigarette tobacco, characterized in that the filter tip is composed of a filtration fiber section, a graphene adsorption section and wrapping paper, one end of the filtration fiber section is coated with graphene, and the wrapping paper is wrapped around the two sections and the cut cigarette tobacco, to form a cigarette with a graphene composite cigarette filter tip, wherein the filtration fiber section has a length of 25~45 mm, the graphene coated adsorption section has a length of 15~30 mm, and the graphene coated on the graphene adsorption section has been subjected to modification, so that the graphene is bonded to the filtration fibers by chemical bonds and the graphene is firmly bonded to the filtration fibers.

The present disclosure also provides a cigarette comprising a filter tip and cut cigarette tobacco, the filter tip and the cut cigarette tobacco being externally wrapped with wrapping paper, and the filter tip comprising a graphene adsorption section.

Preferably, the filter tip further comprises a fiber filtration section, the graphene adsorption section is located between the fiber filtration section and the cut cigarette tobacco. Preferably, one end of the fiber filtration section is coated with graphene, and preferably, the fiber filtration section has a length of 25~45 mm and the graphene adsorption section has a length of 15~30 mm.

Further, the graphene adsorption section is coated with modified graphene, wherein the graphene is bonded by chemical bonds to and firmly bonded to filtration fibers.

Preferably, the graphene adsorption section comprises the above graphene adsorbing material provided by the present disclosure.

The graphene adsorbing material, the preparation method and use thereof, and the cigarette filter tip and the cigarette provided according to the present disclosure can bring about at least one of the following beneficial effects: the present disclosure in which graphene and doped elements are introduced into the fiber carrier can specifically adsorb and filter out harmful substances like fused polycyclic aromatic hydrocarbons such as benzopyrene from the smoke, and simultaneously retain nicotine and other harmless substances, without affecting the smoking taste of tobacco smoke; the cigarette filter tip provided by the present disclosure can effectively adsorb carcinogenic substances like fused polycyclic aromatic hydrocarbons such as benzopyrene from the smoke to reduce the harm of smoking, without affecting the smoking taste of tobacco smoke and without reducing the pleasure of the smoker; in addition, the graphene adsorbing material provided by the present disclosure can also prevent the phenomenon of mildewing of a cigarette holder due to factors such as humid environment, etc.; the cigarette filter tip provided by the present disclosure allows the smoke gas to enter the filtration region from the cigarette interface region and pass through the graphene adsorption section and the fiber filtration section of the filter element, to filter out most of the smoke particulate pollutants and harmful gases, and then allows the cigarette smoke gas to enter the smoker's mouth through the smoking region, which greatly reduces the harm of the cigarette smoke gas to the body during smoking; the respective sections of the cigarette filter tip provided by the present disclosure are movably connected through threads, such that depending on the contamination condition of the filter element, the filter element can be conveniently replaced at any time to ensure the high-efficient filtration of the filter element to remove the harmful substances from the smoke; the cigarette filter tip and the cigarette provided by the present disclosure utilize the excellent adsorption effect of the graphene adsorption section to effectively filter out toxic and harmful gaseous and solid substances such as nicotine gas, tar and nicotine as well as ammonia gas, so as to reduce the harm of the toxic substances to smokers, achieving much better effects than the existing filter tips. Moreover, the present disclosure has the advantages of low cost, easy manufacture, and wide application.

BRIEF DESCRIPTION OF DRAWINGS

For illustrating technical solutions in specific embodiments of the present disclosure or in the prior art more clearly, drawings required for use in the description of the specific embodiments or the prior art will be introduced briefly below. It is obvious that the drawings in the following description are merely illustrative of some embodiments of the present disclosure. It would be understood by those skilled in the art that other drawings could also be obtained from these drawings without any inventive effort.

REFERENCE NUMERALS

Figure 1:
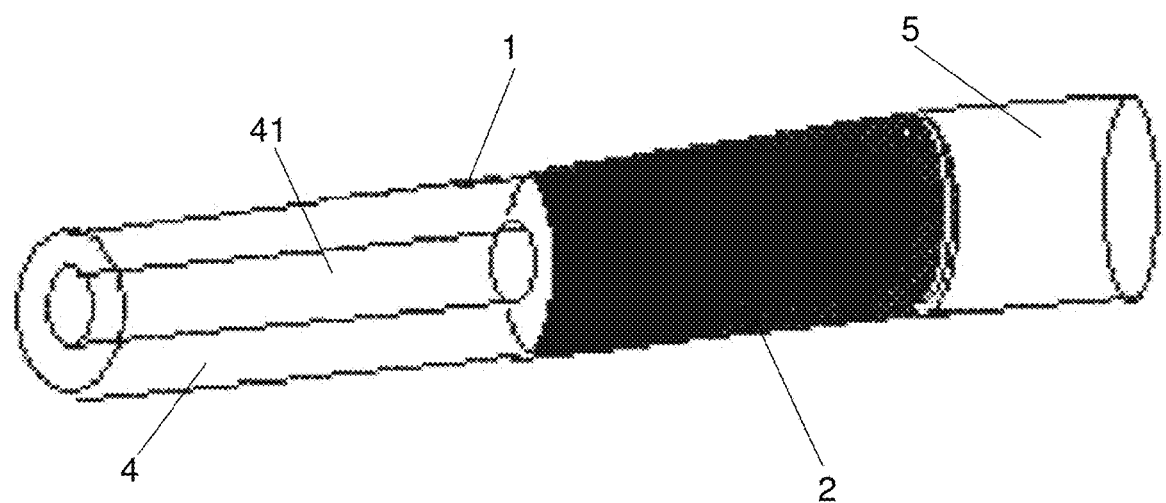
FIG. 1 is a schematic structural diagram of a cigarette filter tip provided in embodiments of the present disclosure (with a filter element comprising only a graphene adsorption section)

Cigarette-filter-tip housing 1, graphene adsorption section 2, fiber filtration section 3, cigarette holder region 4, vent tube 41, cigarette interface region 5, wrapping paper 1', cut cigarette tobacco 6.

DETAILED DESCRIPTION OF EMBODIMENTS

The technical solutions of the embodiments of the present disclosure will be described below clearly and completely. It is apparent that the embodiments to be described are some, but not all of the embodiments of the present disclosure. All the other embodiments obtained by those skilled in the art based on the embodiments of the present disclosure without inventive efforts would fall within the scope of the present disclosure as claimed.

In one aspect, the present disclosure provides a graphene adsorbing material, comprising:

a fiber carrier; and graphene and a doped element which are loaded on the fiber carrier, the doped element comprising at least one of Al, Si and Fe (i.e., the doped element comprising one or several of Al, Si and Fe). Preferably, the graphene and the doped element are introduced by biomass-derived graphene. Graphene and the doped element can be introduced separately or introduced in a mixed way, called as the introducing by mixing (the introducing by mixing comprises the introducing by pre-mixing, and the graphene and the doped element, introduced by the introducing by pre-mixing, comprise those introduced by the introducing by synthesis and the graphene and doped element which have existed already), and biomass-derived graphene is a mixture containing graphene and the doped element.

The graphene described in the present disclosure may be obtained by different preparation methods, for example, mechanical exfoliation method, epitaxial growth method, chemical vapor deposition method, and graphite redox method. Moreover, the graphene used in the present disclosure may also be graphene prepared by hydrothermal carbonization of biomass resources and other methods in the prior art. However, it is difficult to achieve large-scale preparation of graphene in a strict theoretical sense by any of the methods. For example, the graphene prepared in the prior art may have some impurity elements, other allotropes of carbon element, or a graphene structure having non-monolayer and even multiple layers (for example, 3 layers, 5 layers, 10 layers, 20 layers, or the like), and the graphene used in the present disclosure also comprises the above-mentioned graphene that is not in a strict theoretical sense. In addition, "graphene" in the "graphene content" described in the present disclosure is not limited to mono-layered graphene, but may be multilayered or contain other allotropes of carbon, or so-called graphene commercially available that is prepared by the above methods.

The graphene adsorbing material provided by the present disclosure can selectively adsorb benzopyrene from smoke, and has high adsorption efficiency and good smoking taste.

The graphene adsorbing material provided by the present disclosure comprises a fiber carrier, which may be one or several of natural fibers, man-made fibers and synthetic fibers or a mixture thereof, and preferably comprises one or several of semi-synthetic fibers and synthetic fibers. In an embodiment of the present disclosure, the natural fibers comprise plant fibers and animal fibers, the plant fibers comprise fibers obtained from seeds, fruits, stems, leaves and the like of plants, such as cotton fibers and hemp fibers, and the animal fibers comprise animal hairs or silk. In an embodiment of the present disclosure, the man-made fibers, also called semi-synthetic fibers, comprises viscose fiber, cellulose acetate fiber, copper ammonia fiber and other semi-synthetic fibers in the prior art; the synthetic fibers comprise polypropylene fiber (PP fiber), polyacrylonitrile fiber (acrylon), polyvinyl formal fiber (vinylon), polyamide fiber (chinlon), polyethylene terephthalate (terylene), etc. In some embodiments of the present disclosure, the fiber carrier has the following technical indexes:

a fiber length of 5 mm or more, with fineness being not limited;
a fiber moisture content of 5%~10%;
a fiber strength of 1 gram-force or more.

In the present disclosure, the fiber carrier may have arbitrary fiber fineness, and further preferably the range of fineness is 0.13~10 D. The fiber length may be any fiber length, and further preferably the fiber length is 5 mm or more. The fiber moisture content is not limited, and further preferably the fiber moisture content is 5%~10%. The fiber strength is not limited, and further preferably the fiber strength is 1 gram-force or more.

In an embodiment of the present disclosure, the viscose fiber, cellulose acetate fiber, copper ammonia fiber, polypropylene fiber (PP fiber), polyacrylonitrile fiber (acrylon), polyvinyl formal fiber (vinylon), polyamide fiber (chinlon), polyethylene terephthalate (terylene) or other synthetic fibers may be commercially available or may be prepared by methods in the prior art.

In a specific embodiment of the present disclosure, the fiber specifications of the commercially available products of the fiber carrier may comprise 1.5 D*38 mm or 1.5 D*51 mm, a moisture content of 7% and a fiber strength of 1.5 gram-force.

Fibers prepared using the preparation methods in the prior art will be illustrated below.

Taking the preparation of the viscose fiber as an example, the viscose solution used in the present disclosure is a viscose solution well-known in the art, which is prepared by making a pulp as a raw material subjected to processes such as impregnating, squeezing, crushing, aging, xanthation, dissolving, ripening, filtering, and debubbling, etc. The pulp is impregnated with an aqueous solution of sodium hydroxide at a concentration of about 18%, so that cellulose is transformed into alkali cellulose, hemicellulose is dissolved out, and the degree of polymerization is partially decreased; and then the excessive alkaline solution is then removed by squeezing. The blocky alkali cellulose is crushed by a pulverizer into loose flocs, and the uniformity of the subsequent chemical reaction is improved due to the increased surface area. Oxidative decomposition occurs to alkali cellulose under the action of oxygen, resulting in reduction of the average degree of polymerization, and this process is called aging. After the aging, alkali cellulose is reacted with carbon disulfide to generate cellulose xanthate, which is called xanthation, so that hydrogen bonds between macromolecules are further weakened. Due to the hydrophilicity of the xanthate group, the solubility of the cellulose xanthate in a dilute alkali solution is greatly improved. The viscose is obtained just by dissolving the solid cellulose xanthate in the dilute alkali solution. The just-prepared viscose is not easy to shape because of relatively high viscosity and salinity, and must be placed at a certain temperature for a certain period of time, which is called ripening, so that sodium cellulose xanthate in the viscose is gradually hydrolyzed and saponified, the degree of esterification is decreased, and the viscosity and the stability as well as stability to the effects of an electrolyte also changes therewith. After the ripening, debubbling and filtration should be carried out to remove bubbles and impurities.

In an embodiment of the present disclosure, the process procedures and conditions for preparing viscose fiber filaments are specifically as follows:

1. Alkali impregnation process conditions: an alkali solution (NaOH): concentration of 240 g/L, temperature of 20° C.; impregnation time: 120 min;

2. Aging (or ageing) process conditions: temperature of 25° C., time of 34 h;

3. Xanthation process conditions: the xanthation method is wet xanthation, wherein for alkalization: time of 30 min, temperature of $21.0\pm0.5°$ C.; for xanthation: time of 120 min, initial temperature of $21.0\pm0.5°$ C. and final temperature of $30.0\pm0.5°$ C.; mass of added $CS_2$ being 34.5% (relative to α-cellulose); for pre-dissolution: time of 120 min, temperature of $16.5\pm0.5°$ C.; and for post-dissolution: time of 180 min, temperature of $16.5\pm0.5°$ C.;

4. The prepared viscose stock solution comprises, by dispersed mass:
α-cellulose $8.30\pm0.10\%$;
NaOH $5.80\pm0.10\%$;
S $2.25\pm0.1\%$;

5. Viscose ripening conditions: time of 36 h~38 h, temperature of $19.0\pm0.5°$ C.;

6. Indexes of the resulting spinning viscose: viscosity of 30~40 Pa·S (20° C., falling-ball method), and a ripening degree of 7.8~8.6 mL (10% $NH_4Cl$ value);

7. Spinning process conditions: spinning speed of 82 m/min, draft of 25%, and tension draft of 4.12%;

8. The conditions of a coagulation bath are as follows:
An acid bath consists of:
$H_2SO_4$ $132.0\pm1.0$ g/L;
$ZnSO_4$ $10.5\pm0.5$ g/L;
$Na_2SO_4$ $265.0\pm5.0$ g/L;
temperature of $52.0\pm1.0°$ C.; specific gravity of $1.270\pm0.005$.

On the fiber carrier, the graphene adsorbing material provided by the present disclosure comprises the loaded graphene and doped element, the doped element comprising one or several of Al, Si and Fe. In the present disclosure, with the introduction of the graphene and the doped element in the fiber carrier, the effect of filtering out harmful substances such as benzopyrene from smoke by the adsorbing material can be further improved, and at the same time, good smoking taste of tobacco smoke is ensured.

Graphene, a two-dimensional material with a honeycomb structure consisting of a single layer of sp$^2$ hybridized carbon atoms, has many excellent properties. The structure of the graphene is shown as Formula 1:

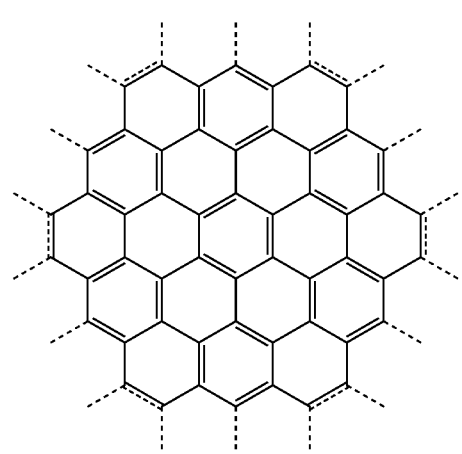

Formula 1

The graphene described in the present disclosure is dispersed on a fiber carrier so that the fiber carrier contains the graphene. In a preferred embodiment of the present disclosure, the graphene content is 0.1~10 wt %, preferably 0.5~7.8 wt %, more preferably 1~4 wt %, for example 0.1 wt %, 0.3 wt % 0.5 wt %, 0.7 wt %, 1 wt %, 3 wt %, 5 wt %, 6 wt %, 7.8 wt %, 8.9 wt %, 10 wt % or the like, relative to the fiber carrier. In some embodiments of the present disclosure, the graphene has a porous structure, and specifically, is pretreated to have irregularly distributed micro-pores, wherein the porosity may be 2%~10%, and preferably 3%~7%; and the pore diameter ranges from 1 to 20 nm.

In the present disclosure, the graphene is preferably biomass-derived graphene, or preferably, the graphene and the doped element are introduced by the biomass-derived graphene, The biomass-derived graphene contains a graphene sheet structure of 10 or less layers, an sp$^3$ hybridized structure of carbon, and mineral elements, wherein the mineral elements comprise Fe, Si and Al elements. In an embodiment of the present disclosure, the element content of the mineral elements is 0.5 wt %~6 wt %, and preferably 1.5 wt %~5 wt % of the weight of the biomass-derived graphene. The mineral elements preferably further comprise any one or more of P, Ca, Na, Ni, Mn, K, Mg, Cr, S and Co; the mineral elements are present in form of simple substances and/or compounds, wherein the compounds comprise oxides and/or carbides, they are adsorbed onto the surface or to inside of the biomass-derived graphene. In an embodiment of the present disclosure, the carbon content in the biomass-derived graphene is ≥80 wt %, preferably more than 85 wt %, more preferably more than 90 wt %, and most preferably more than 95 wt %. In an embodiment of the present disclosure, the graphene is a six-membered-ring honeycomb-like sheet structure of carbon having a thickness of 100 nm or less. In an embodiment of the present disclosure, on one hand, the porous graphene can provide a passage for convection of smoke and air, to prevent incomplete combustion of cut tobacco and reduce the generation of harmful substances due to incomplete combustion; on the other hand, the porous graphene having a characteristic of large specific surface area can effectively selectively adsorb carcinogenic fused polycyclic aromatic hydrocarbons (PAHs) such as benzopyrene.

In the present disclosure, the doped element comprises one or several of Al, Si and Fe, and preferably comprises Al, Si and Fe. The doped element is dispersed on the fiber carrier such that the fiber carrier contains the doped element. In a preferred embodiment of the present disclosure, the content of the doped element is 0.002~1 wt %, preferably 0.02~0.8 wt %, and more preferably 0.2~0.5 wt % of the weight of the fiber carrier. In addition, the doped element preferably further comprises one or several of K, Na, Ca, Mg, P, Mn and Co.

The graphene adsorbing material provided by the present disclosure, belonging to carbon nanomaterial products, has a specific adsorption property, thus specifically adsorbing harmful substances such as benzopyrene from smoke without affecting the smoking taste of tobacco smoke.

Accordingly, the present disclosure provides a method of preparing a graphene adsorbing material, comprising the steps of: bringing fibers into contact with a graphene material for loading, so that the graphene material is loaded on the fibers, thereby obtaining a graphene adsorbing material, wherein the graphene material comprises graphene and a doped element, and the doped element comprises one or several of Al, Si and Fe.

The graphene adsorbing material prepared by the present disclosure can effectively adsorb harmful substances such as benzopyrene from smoke without affecting the smoking taste of tobacco smoke. In addition, the method of preparing a graphene adsorbing material in the present disclosure is easy to operate and is suitable for widespread industrialization.

In the present disclosure, the fibers are used as a carrier, and the graphene and the doped element are loaded on the fiber carrier to obtain a graphene adsorbing material. Here, the disclosure of the fiber carrier is as described above, which is not described in detail herein.

In a preferred embodiment of the present disclosure, the graphene content is 0.1~10 wt %, preferably 0.5~7.8 wt %, more preferably 1~4 wt %, for example 0.1 wt %, 0.3 wt % 0.5 wt %, 0.7 wt %, 1 wt %, 3 wt %, 5 wt %, 6 wt %, 7.8 wt %, 8.9 wt %, 10 wt % or the like, relative to the fiber carrier. In some embodiments of the present disclosure, the graphene has a porous structure, and specifically, is treated to have irregularly distributed micro-pores, wherein the porosity may be 2%~10%, and preferably 3%~7%; and the pore diameter ranges from 1 to 20 nm. In the present disclosure, the source of the graphene is not particularly limited, and the graphene may be a commercially available product or may be prepared. The graphene may be prepared by a mechanical exfoliation method, an epitaxial growth method, a chemical vapor deposition method, or a graphite redox method, and by hydrothermal carbonization of biomass resources.

In one embodiment of the present disclosure, the graphene is preferably biomass-derived graphene, or preferably, the graphene and the doped element are introduced by the biomass-derived graphene. The biomass-derived graphene contains a graphene sheet structure of 10 or less layers, an sp$^3$ hybridized structure of carbon, and mineral elements, wherein the mineral elements comprise Fe, Si and Al elements. In an embodiment of the present disclosure, the element content of the mineral elements is 0.5 wt %~6 wt %, and preferably 1.5 wt %~5 wt % of the weight of the biomass-derived graphene. The mineral elements preferably further comprise any one or more of P, Ca, Na, Ni, Mn, K, Mg, Cr, S and Co; the mineral elements are present as simple substances and/or compounds, wherein the compounds comprise oxides and/or carbides, they are adsorbed onto the surface or to inside of the biomass-derived graphene. In an embodiment of the present disclosure, the carbon content in the biomass-derived graphene is ≥80 wt %, preferably more than 85 wt %, more preferably more than 90 wt %, and most preferably more than 95 wt %. In an embodiment of the present disclosure, the graphene is a six-membered-ring honeycomb sheet structure of carbon having a thickness of 100 nm or less.

In an embodiment of the present disclosure, the biomass-derived graphene may be prepared by using hydrothermal carbonization of biomass resources. Specifically, an example is given below for description:

Method 1:

(1) catalytically treating a biomass carbon source under the action of a catalyst, to obtain a precursor;

(2) maintaining the precursor at a temperature of 140° C.~180° C. for 1.5 h~2.5 h under the condition of a protective gas, to obtain a first intermediate;

(3) heating the first intermediate to a temperature of 350° C.~450° C. and maintaining the first intermediate at the temperature for 3 h~4 h, under the condition of a protective gas, to obtain a second intermediate;

(4) heating the second intermediate to a temperature of 1100° C. to 1300° C. and maintaining the second intermediate at the temperature for 2 h~4 h, under the condition of a protective gas, to obtain a third intermediate; and (5) performing alkali washing, acid washing, and water washing on the third intermediate sequentially, to obtain graphene, wherein the heating rate in Steps (3) and (4) is 14° C./min~18° C./min.

The biomass-derived graphene prepared in the above method 1 (the graphene prepared in the prior art may have some impurity elements, other allotropes of carbon element, or a graphene structure having non-monolayer or even multiple layers, and the graphene prepared by this biomass method is also a mixture, that is, a graphene material) contains graphene, amorphous carbon, and elements which are not carbon and not oxygen.

Specifically:

firstly, the biomass carbon source is mixed with the catalyst, stirred for catalytic treatment, and then dried to obtain the precursor;

then, the precursor is maintained, in a protective atmosphere, at a temperature of 140~180° C. for 1.5~2.5 h, to obtain the first intermediate. In some specific embodiments of the present disclosure, the temperature is 142° C., 148° C., 155° C., 160° C., 172° C., or 178° C.; and the temperature is maintained for 1.6 h, 1.8 h, 2 h, 2.2 h, or 2.4 h.

Subsequently, the first intermediate is subjected to programmed temperature increase to 350~450° C. and maintained at the temperature for 3~4 h, to obtain a second intermediate. In some specific embodiments of the present disclosure, the temperature is 360° C., 370° C., 380° C., 390° C., 410° C., 420° C., 430° C., or 440° C.; and the temperature is maintained for 3.1 h, 3.3 h, 3.5 h, 3.8 h, or 3.9 h.

Then the second intermediate is subjected to programmed temperature increase to 1100~1300° C. and maintained for 2~4 h, to obtain a third intermediate, i.e., a crude product. In some specific embodiments of the present disclosure, the temperature is 1130° C., 1170° C., 1210° C., or 1280° C.; and the time is 2.2 h, 2.4 h, 2.6 h, 2.8 h, 3.0 h, 3.2 h, 3.4 h, 3.6 h, or 3.8 h.

The heating rate in the programmed temperature increase is 14° C./min~18° C./min, and in some specific embodiments of the present disclosure, the heating rate is 15° C./min, 16° C./min, or 17° C./min.

Finally, the third intermediate (i.e., the crude product) is washed with an alkali, washed with an acid, and washed with water to obtain a compound.

In the present disclosure, the mass ratio of the biomass carbon source to the catalyst is 1: (0.5~5), and preferably 1: (1~3). In some specific embodiments of the present disclosure, the ratio is 1:0.5, 1:1, or 1:3.

In the present disclosure, the catalyst is any one selected from a halogen compound of manganese, an iron-containing compound, a cobalt-containing compound and a nickel-containing compound, or a combination of at least two of them.

Preferably, the iron-containing compound is any one selected from a halogen compound of iron, a cyanide of iron, and an acidic iron-containing salt, or a combination of at least two of them. The acidic iron-containing salt is a salt of an organic acid containing an iron element or a salt of an inorganic acid containing an iron element. The halogen compound of iron may be iron chloride and/or iron bromide.

Preferably, the cobalt-containing compound is any one selected from a halogen compound of cobalt and an acidic cobalt-containing salt, or a combination of at least two of them. The acidic cobalt-containing salt is a salt of an organic acid containing a cobalt element or a salt of an inorganic acid containing a cobalt element. The halogen compound of cobalt may be cobalt chloride and/or cobalt bromide.

Preferably, the nickel-containing compound is any one selected from a halogen compound of nickel and an acidic nickel-containing salt, or a combination of at least two of them. The acidic nickel-containing salt is a salt of an organic acid containing a nickel element or a salt of an inorganic acid containing a nickel element. The halogen compound of nickel may be nickel chloride and/or nickel bromide.

Preferably, the catalyst is any one selected from ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate, or a combination of at least two of them.

Typical but non-limiting examples of combinations of the catalysts described in the present disclosure comprise a combination of ferrous chloride and ferric sulfate, a combination of potassium ferricyanide and potassium trioxalatoferrate, a combination of cobalt chloride, cobalt nitrate and ferric chloride, a combination of cobalt sulfate, cobalt acetate and nickel nitrate, and a combination of ferric chloride, cobalt chloride and nickel acetate.

The stirring for catalytic treatment is carried out at a temperature of 150° C.~200° C., for example 160° C., 170° C., 180° C., 190° C., or the like, for a time period of ≥4 h, preferably 4 h~14 h. In some specific embodiments of the present disclosure, the time period is 4.2 h, 7 h, 9 h, 12 h, 16 h, 19 h, or 23 h.

Preferably, the moisture content in the precursor is 10 wt % or less. In some specific embodiments of the present disclosure, the moisture content is 1 wt %, 2 wt %, 3 wt %, 4 wt %, 5 wt %, 6 wt % 7 wt %, 8 wt %, 10 wt %, or the like.

Preferably, the protective atmosphere is any one of nitrogen, helium and argon, or a combination of at least two of them, and preferably is nitrogen.

Preferably, the acid washing is carried out using an aqueous solution of hydrochloric acid having a concentration of 3 wt %~6 wt %, further preferably an aqueous solution of hydrochloric acid having a concentration of 5 wt %; the water washing is preferably carried out using deionized water and/or distilled water; and the alkali washing is carried out using an aqueous solution of sodium hydroxide having a concentration of 5 wt %~15 wt %, and further preferably an aqueous solution of sodium hydroxide having a concentration of 10 wt %.

Preferably, the washing temperature is 55 to 65° C., for example 56° C., 57° C., 58° C., 60° C., 63° C., or the like, and preferably 60° C.

The biomass carbon source is cellulose and/or lignin, preferably cellulose, and further preferably porous cellulose.

The porous cellulose described in the present disclosure may be obtained by the prior art. Typical but non-limiting prior art methods for obtaining porous cellulose comprise, for example, a method of preparing porous cellulose disclosed in patent with publication No. CN104016341A, and a method of preparing cellulose disclosed in CN103898782A.

Preferably, the porous cellulose is obtained by:
performing acid hydrolysis on a biomass resource to obtain lignocellulose, which is subsequently subjected to porosification treatment to obtain porous cellulose, wherein optionally, the porous cellulose is used after being bleached.

The biomass resource is any one selected from plants and/or agricultural and forestry wastes, or a combination of at least two of them; and any one or a combination of at least two of agricultural and forestry wastes is preferred.

Preferably, the agricultural and forestry wastes are any one selected from cornstalks, corncob, sorghum stalks, beet pulp, bagasse, furfural residue, xylose residue, wood chips, cotton stalks and reed, or a combination of at least two of them, and corncob is preferred.

Typical, but non-limiting examples of combinations of the biomass resources described in the present disclosure comprise a combination of cornstalks and corncob, a combination of bagasse, sorghum stalks and wood chips, a combination of beet pulp, bagasse and corncob, a combination of sorghum stalks, beet pulp and xylose residue, etc.

The graphene may also be prepared by a variety of methods as follows:
Method 2: the method disclosed in CN104118873A.
Method 3: the method disclosed in CN104016341A.
Method 4: the method disclosed in CN104724696A.
Method 5: the method disclosed in CN104724699A.
Method 6: the method disclosed in CN105060289A.

In the present disclosure, the doped element comprises one or several of Al, Si and Fe, and preferably comprises Al, Si and Fe. The doped element is dispersed on the fiber carrier such that the fiber carrier contains the doped element. In a preferred embodiment of the present disclosure, the content of the doped element is 0.002~1 wt %, preferably 0.02~0.8 wt %, and more preferably 0.2~0.5 wt % of the weight of the fiber carrier. In addition, the doped element preferably further comprises one or several of K, Na, Ca, Mg, P, Mn and Co.

In the present disclosure, the doped element may be introduced by adding a nano-material containing a doped element, or may be introduced by a mixed form of graphene and the doped element. The mixed form may be a mixture formed by controlling the content of the doped element in a conventional process of preparing graphene. Preferably, during the preparation of graphene from graphite by the redox method, due to the presence of mineral elements in graphite itself, graphene containing mineral elements is prepared by reasonable control of the types and contents of the elements. Alternatively, graphene is prepared by using biomass resources as a raw material and controlling the content of the doped element during the process. It is preferable in the present disclosure to prepare graphene containing mineral elements using the biomass resources by the hydrothermal carbonization process. Here, the mineral element is the doped element.

Specifically, in an embodiment of the present disclosure, the graphene material (biomass-derived graphene) prepared by the above method is dispersed in a solvent (the solvent comprising at least one of ethylene glycol, dimethylformamide, N-methylpyrrolidone, ethanol and water) to prepare a graphene solution, and then fibers are immersed in the graphene solution for a certain period of time, such as 10~60 min, washed and dried to obtain a graphene adsorbing material. That is, the graphene solution is prepared by dispersing a graphene material in a solvent. In addition, the graphene material may be composed of graphene and a material containing a doped element, or may be graphene containing a doped element, and preferably is biomass-derived porous graphene (i.e., biomass-derived graphene).

In a preferred embodiment of the present disclosure, a coupling agent is also dissolved in the graphene solution. The coupling agent preferably comprises one or several of a silane coupling agent, a titanate coupling agent, a zirconium-based coupling agent, and the like. The amount of the coupling agent used is preferably 1%~10%, preferably 2%~8%, of the mass of the graphene.

In some embodiments of the present disclosure, the biomass-derived porous graphene is uniformly dispersed in a solvent to form a graphene solution. In some other embodiments of the present disclosure, graphene and a material containing a doped element are uniformly dispersed in a solvent to form a graphene solution. In the above, the doped element comprises at least Fe, Si and Al, and may further comprises one or several of K, Na, Ca, Mg, P, Mn and Co. The material containing the doped element may specifically be nano phosphorus pentoxide, nano silicon powder, nano aluminum powder, nano iron, nano magnesium powder, nano sodium carbonate, nano potassium carbonate, nano calcium carbonate, nano manganese oxide, nano cobalt, etc.

The graphene described in the present disclosure may be obtained by different preparation methods, for example, mechanical exfoliation method, epitaxial growth method, chemical vapor deposition method, and graphite redox method, and may also be graphene prepared by hydrothermal carbonization of biomass resources and other methods in the prior art. However, it is difficult to achieve large-scale preparation of graphene in a strict theoretical sense by any of the methods. For example, the graphene prepared in the prior art may have some impurity elements, other allotropes of carbon element, or a graphene structure having non-monolayer and even multiple layers (for example, 3 layers, 5 layers, 10 layers, 20 layers, or the like), and the graphene used in the present disclosure also comprises the above-mentioned graphene that is not in a strict theoretical sense. For example, the graphene prepared using graphite ore as a raw material may contain some mineral elements present in the graphite ore itself. The mentioned biomass-derived graphene is graphene prepared using biomass resources as raw materials, which may also have mineral elements absorbed by plants from the soil for their own needs and other allotropes of carbon. Therefore, the graphene mentioned in the present disclosure is specifically a mixture containing graphene.

In an embodiment of the present disclosure, the solvent of the graphene solution is preferably one of ethylene glycol, dimethylformamide (DMF), N-methylpyrrolidone (NMP), ethanol and water, or a mixture of several of them. The dispersion is preferably ultrasonic dispersion, by which a graphene solution with a graphene concentration of 0.1~10 mg/mL, and preferably 0.5~3 mg/mL, may be prepared.

Before performing loading on the fibers, the present disclosure preferably further comprises performing activation treatment on the fibers to remove impurities and foreign odors contained in the carrier itself, and drying to obtain an activated fiber carrier. In an embodiment of the present disclosure, the activation treatment may be carried out by boiling in boiling water, preferably boiling in boiling water for 25~30 min.

In an embodiment of the present disclosure, the activated fiber carrier is immersed in a graphene solution for 10~60 min, washed and dried to obtain a graphene adsorbing material. In the above, the immersion is carried out preferably by: firstly performing ultrasonic treatment, subsequently oscillating, and then leaving to stand. Between the immersion and the washing, the present disclosure preferably further comprises performing an immobilization treatment, wherein the immobilization treatment may be a chemical method, in which a reagent used preferably comprises one of anhydrous ethanol, anhydrous methanol and dilute nitric acid or a combination of several of them.

The graphene adsorbing material prepared by the present disclosure comprises: a fiber carrier, and graphene and a doped element which are loaded on the fiber carrier, wherein the doped element comprises one or several of Al, Si and Fe. The graphene adsorbing material provided by the present disclosure may selectively adsorb fused polycyclic harmful substances such as benzopyrene from the smoke, achieving high adsorption efficiency and better smoking taste, and may be used for a cigarette filter tip. In addition, the graphene adsorbing material prepared by the present disclosure can also prevent the phenomenon of mildewing of a cigarette holder due to factors such as humid environment, etc.

The present disclosure also provides use of the above graphene adsorbing material or a graphene adsorbing material prepared according to the above preparation method in smoke filtration. Further, a device for the smoke filtration of comprises a cigarette filter tip, an air conditioning filter element, or a vehicle exhaust emission device, that is, the disclosure provides use of the above graphene adsorbing material in a cigarette filter tip, an air conditioning filter element, or a vehicle exhaust emission device. The device for smoke filtration comprises a cigarette filter tip, an air conditioning filter element, or a vehicle exhaust emission device. In the present disclosure, the device for smoke filtration may be prepared using the above graphene adsorbing material according to a conventional method.

FIG. 1 is a schematic structural diagram of a cigarette filter tip provided in embodiments of the present disclosure (with a filter element comprising only a graphene adsorption section). Referring to FIG. 1, the present disclosure also provides a rolling tobacco filter tip or cigarette filter tip, referred to as the filter tip, which comprises a cigarette-filter-tip housing 1 and a filter element, wherein the cigarette-filter-tip housing 1 is preferably molded (or cast-molded) from food-grade plastic, the cigarette-filter-tip housing 1 comprises a cigarette holder region 4, a filtration region and a cigarette interface region 5, the filter element, arranged tightly in the filtration region, comprises a graphene adsorption section 2, and preferably the filter element is cylindrical and is in close contact with an inner wall of the filtration region of the cigarette-filter-tip housing 1, that is, the filter element of the present filter tip may comprise a fiber section made of a conventional graphene material (i.e., graphene adsorption section 2), or may also comprise a fiber section made of the graphene adsorbing material described above or a graphene adsorbing material prepared by the preparation method described above (i.e., graphene adsorption section 2). The prepared fiber section is the graphene adsorption section 2 coated with modified graphene, with the graphene bonded by chemical bonds to and firmly bonded to the filtration fibers (i.e., the graphene coated on the graphene adsorption section 2 is subjected to modification, so that the graphene is bonded to the filtration fibers by chemical bonds, and the graphene is firmly bonded to the filtration fibers.

Figure 2:
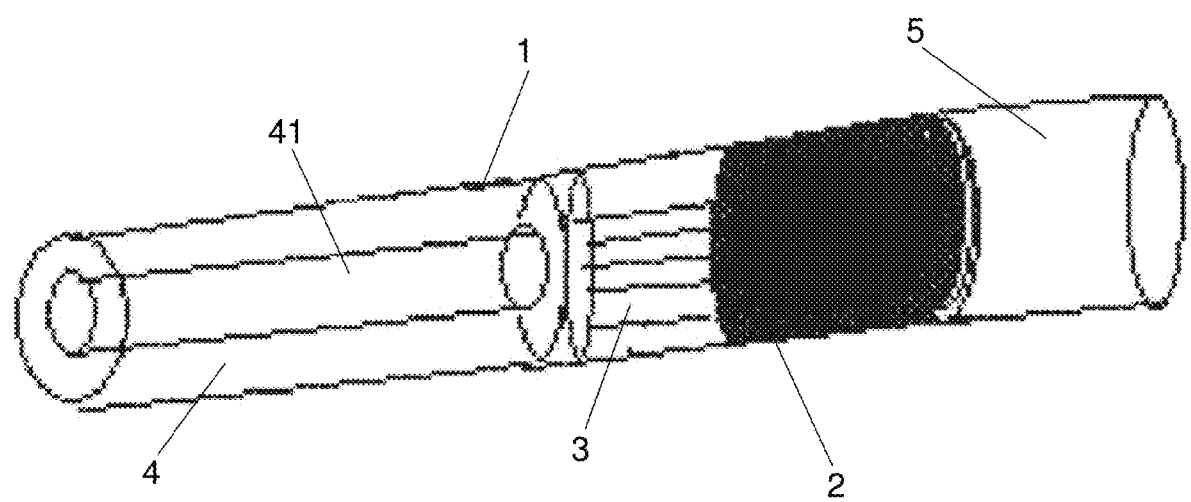
FIG. 2 is a schematic structural diagram of a cigarette filter tip provided in embodiments of the present disclosure (with a filter element comprising a graphene adsorption section and a fiber filtration section)

In addition, FIG. 2 is a schematic structural diagram of a cigarette filter tip provided in embodiments of the present disclosure (with a filter element comprising a graphene adsorption section and a fiber filtration section). Referring to FIG. 2, preferably, the filter element of the above cigarette filter tip also comprises a fiber filtration section 3 for further filtration to filter out particles generated at the graphene adsorption section 2, the fiber filtration section 3 is close to the cigarette holder region 4, and the graphene adsorption section 2 is close to the cigarette interface region 5. Preferably, the fiber filtration section 3 has a length of 20~40 mm, and the graphene adsorption section 2 has a length of 15~30 mm.

That is, a filter element is provided in the filtration region, with the filter element having a fiber filtration section 3 and a graphene adsorption section 2 sequentially from an upper end of the cigarette holder region 4 to an initial end of the cigarette interface region 5, and the filter element is seamlessly embedded in the filtration region, the fiber filtration section 3 of the filter element has a length of 20~40 mm, and the graphene coated adsorption section 2 of the filter element has a length of 15~30 mm.

The cigarette holder region 4 and the cigarette interface region 5 are connected with the filtration region by threads, respectively, such that depending on the degree of contamination of the filter element in the filtration region, the filtration region can be opened for replacement of the filter element at any time. Preferably, the housing 1 at the cigarette holder region 4 is oblate or circular, and the cigarette holder region 4 is provided at center with a vent tube 41. Preferably, the vent tube 41 has a diameter of 1~3 mm.

The rolling tobacco (or cigarette) filter tip provided by the present disclosure can effectively adsorb harmful substances such as benzopyrene from the smoke, reducing the harm of smoking; and at the same time, retain nicotine and harmless substances, to ensure good smoking taste of tobacco smoke and not reduce the pleasure of a smoker.

In the present disclosure, a conventional graphene material or the graphene adsorbing material described above is made into a filter tip using a conventional filter-tip making method. In an embodiment of the present disclosure, the thickness of a fiber section made of the graphene adsorbing material described above is preferably 1~4 mm, and the thickness of the fiber section is a thickness in an axial direction of the filter tip. In an embodiment of the present disclosure, the filter tip is a binary composite filter tip, in which an end in contact with cut tobacco is closely connected to the fiber section loaded with the graphene and the doped element, and then connected to an ordinary fiber section.

Figure 3:
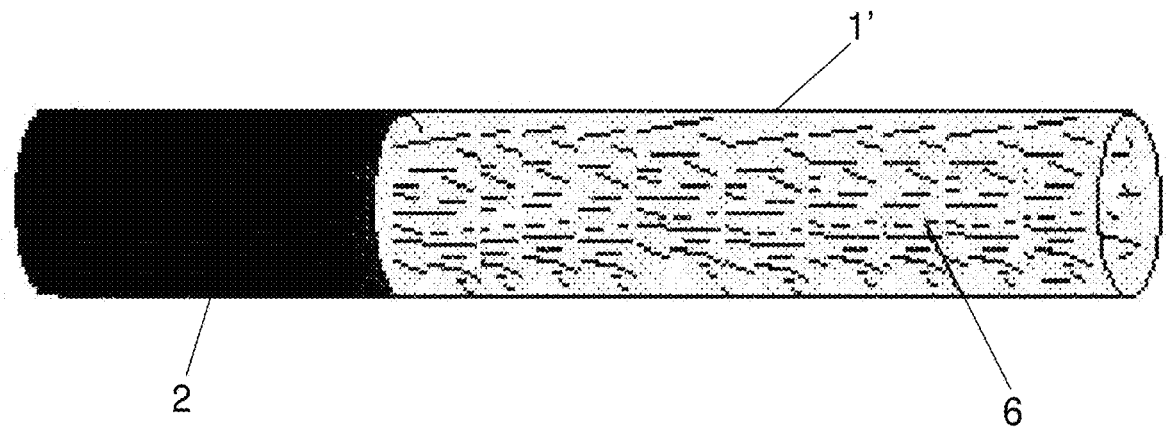
FIG. 3 is a schematic structural diagram of a cigarette provided in embodiments of the present disclosure (with a filter tip comprising only a graphene adsorption section)

FIG. 3 is a schematic structural diagram of a cigarette provided in embodiments of the present disclosure (with a filter element comprising only a graphene adsorption section). Referring to FIG. 3, the present disclosure also provides a cigarette, comprising: a filter tip and cut cigarette tobacco, characterized in that the filter tip is composed of a filtration fiber section (or fiber filtration section 3), a graphene adsorption section 2 and wrapping paper 1', one end of the filtration fiber section (or fiber filtration section 3) is coated with graphene, and the wrapping paper 1' is wrapped around the two sections and the cut cigarette tobacco 6, to form a cigarette with a graphene composite cigarette filter tip, wherein the filtration fiber section (or fiber filtration section 3) has a length of 25~45 mm, the graphene coated adsorption section 2 has a length of 15~30 mm, and the graphene coated on the graphene adsorption section 2 is subjected to modification, so that the graphene is bonded to the filtration fibers by chemical bonds, and the graphene is firmly bonded to the filtration fibers.

In addition, the present disclosure also provides a cigarette comprising a filter tip and cut cigarette tobacco 6, wherein the filter tip and the cut cigarette tobacco 6 are externally wrapped with wrapping paper 1', and the filter tip comprises a graphene adsorption section 2. The graphene adsorption section 2 may comprise a conventional graphene material, or may also comprise a graphene adsorbing material described above or a graphene adsorbing material prepared by the preparation method described above.

Figure 4:
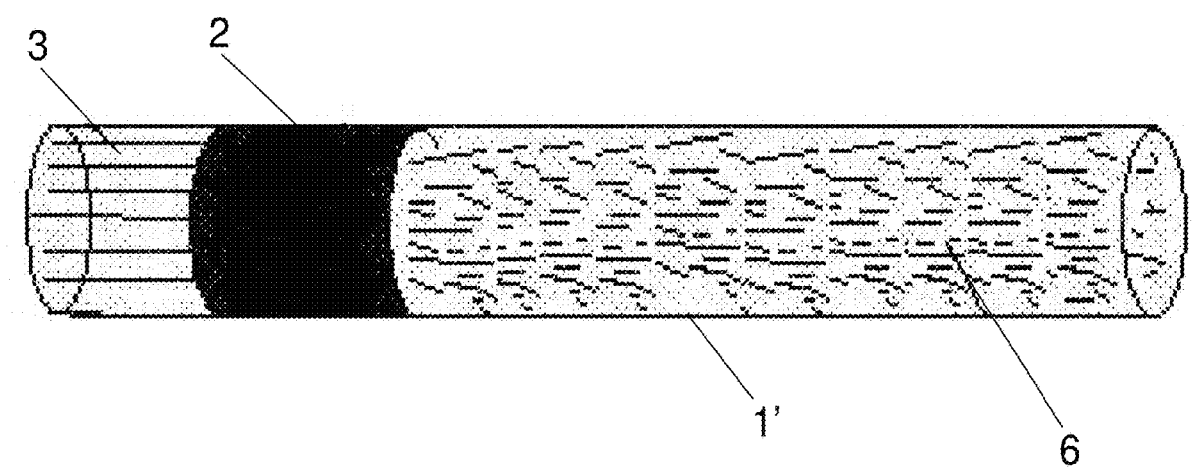
FIG. 4 is a schematic structural diagram of a cigarette provided in embodiments of the present disclosure (with a filter tip comprising a graphene adsorption section and a fiber filtration section).

FIG. 4 is a schematic structural diagram of a cigarette provided in embodiments of the present disclosure (with a filter element comprising a graphene adsorption section and a fiber filtration section). Referring to FIG. 4, preferably, the filter tip of the above cigarette further comprises a fiber filtration section 3, and the graphene adsorption section 2 is located between the fiber filtration section 3 and the cut cigarette tobacco 6. Preferably, one end of the fiber filtration section 3 is coated with graphene, and preferably, the fiber filtration section 3 has a length of 25~45 mm, and the graphene adsorption section 2 has a length of 15~30 mm.

In the present disclosure, smoke generated from cigarettes made of the same weight of rolled tobacco was collected on a smoking machine under the same operation condition, and the collected samples were analyzed by a gas chromatograph-mass spectrometer to determine changes in peak shapes of different ingredients in the smoke before and after adsorption.

The smoking tastes of the cigarette filter tip and the cigarette provided by the present disclosure were evaluated, and specifically the aroma, foreign odors, pungency and remaining taste thereof were evaluated. For the evaluation of each Example, 200 evaluators were selected for blind sample test. The evaluation criteria are shown in Table 1 below.

TABLE 1

| | Criteria for Evaluation of Smoking Taste of Smoke from Cigarette Filter Tip | | | | | | | |
|---|---|---|---|---|---|---|---|---|
| | Aroma | | Foreign Odor | | Pungency | | Remaining Taste | |
| Score Section | Index | Highest Score | Index | Highest Score | Index | Highest Score | Index | Highest Score |
| I | rich and mild | 32 | no foreign odors | 12 | no pungency | 20 | pure and comfortable | 25 |
| II | sufficient and slightly rough | 28 | slightly mixed with foreign odors | 10 | rarely pungent | 17 | pure and relatively comfortable | 22 |
| III | thin and relatively rough | 24 | rarely mixed with foreign odors | 8 | relatively pungent | 15 | pure and yet comfortable | 20 |

The results showed that the cigarette filter tip and the filter tip in the cigarette provided by the present disclosure can effectively adsorb harmful substances such as benzopyrene from the smoke to reduce the harm of smoking, without affecting the smoking taste of tobacco smoke and without reducing the pleasure of the smoker.

For further understanding of the present disclosure, the graphene adsorbing material, the preparation method thereof and the cigarette filter tip provided by the present disclosure will be described in detail below with reference to the Examples.

The biomass-derived graphene of the present disclosure is prepared by the following method:

(1) catalytically treating a biomass carbon source under the action of a catalyst to obtain a precursor;

(2) maintaining the precursor at a temperature of 140° C.~180° C. for 1.5 h~2.5 h under the condition of a protective gas to obtain a first intermediate;

(3) heating the first intermediate to a temperature of 350° C.~450° C. and maintaining the first intermediate at the temperature for 3 h~4 h, under the condition of a protective gas, to obtain a second intermediate;

(4) heating the second intermediate to a temperature of 1100° C. to 1300° C. and maintaining the second intermediate at the temperature for 2 h~4 h, under the condition of a protective gas, to obtain a third intermediate; and (5) performing alkali washing, acid washing, and water washing on the third intermediate sequentially to obtain a compound, wherein the heating rate in Steps (3) and (4) is 14° C./min~18° C./min. The biomass-derived graphene contains a graphene sheet structure of 10 or less layers, an $sp^3$ hybridized structure of carbon, and mineral elements; and the mineral elements comprise Fe, Si and Al elements. In an embodiment of the present disclosure, the element content of the mineral elements is 0.5 wt %~6 wt %, preferably 1 wt %, 2 wt %, 3 wt %, 4 wt %, 5 wt %, or the like of the weight of the biomass-derived graphene; and the mineral elements may mainly comprise P, Si, Ca, Al, Fe, and Mg elements.

More specifically, the biomass-derived graphene used in the present disclosure is prepared by the following Preparation Examples 1 to 4.

Preparation Example 1

(1) Corncob cellulose was subjected to catalytic treatment under the action of ferrous chloride to obtain a precursor;

(2) the precursor was maintained at a temperature of 150° C. for 2 h under the condition of nitrogen to obtain a first intermediate;

(3) the first intermediate was heated to a temperature of 400° C. and maintained at the temperature for 3.5 h under the condition of nitrogen to obtain a second intermediate;

(4) the second intermediate was heated to a temperature of 1200° C. and maintained at the temperature for 3 h under the condition of nitrogen to obtain a third intermediate; and (5) the third intermediate was washed with a sodium hydroxide solution having a concentration of 10 wt %, washed with hydrochloric acid having a concentration of 4 wt %, and washed with water to give the biomass-derived graphene, wherein the heating rate in Steps (3) and (4) was 15° C./min~16° C./min.

It was detected by XRD that the content of mineral elements in the biomass-derived graphene prepared in Preparation Example 1 of the present disclosure was 4 wt % of the weight of the biomass-derived graphene, and the mineral elements in the biomass-derived graphene mainly comprise P, Si, Ca, Al, Fe, and Mg elements.

Preparation Example 2

Biomass-derived graphene was prepared by the same method as in Preparation Example 1, except that the catalyst used in Step (1) was a mixture of ferric chloride and nickel nitrate (at a mass ratio of 3:1), and the biomass carbon source was corncob cellulose bleached with hydrogen peroxide; the protective gas used in Steps (2)-(4) was argon, the precursor was maintained at a temperature of 140° C. for 2.5 h, the first intermediate was heated to a temperature of 250° C. and maintained at the temperature for 4 h, and the second intermediate was heated to a temperature of 1100° C. and maintained at the temperature for 2 h; and the alkali used in Step (5) was 5 wt % NaOH aqueous solution, and the acid used was 3 wt % hydrochloric acid aqueous solution.

It was detected that the content of mineral elements in the biomass-derived graphene prepared in Preparation Example 2 of the present disclosure was 2 wt % of the biomass-derived graphene, and the mineral elements in the biomass-derived graphene mainly comprise Si, Al, and Fe elements.

Preparation Example 3

Biomass-derived graphene was prepared by the same method as in Preparation Example 1, except that the catalyst used in Step (1) was a mixture of ferrous chloride and ferric sulfate (at a mass ratio of 3:1), and the biomass carbon source was lignocellulose; in Steps (2)-(4), the precursor was maintained at a temperature of 180° C. for 1.5 h, the first intermediate was heated to a temperature of 450° C. and maintained at the temperature for 4 h, and the second intermediate was heated to a temperature of 1300° C. and maintained at the temperature for 2 h; and the alkali used in Step (5) was 15 wt % sodium hydroxide aqueous solution, and the acid used was 6 wt % hydrochloric acid aqueous solution.

The content of mineral elements in the biomass-derived graphene prepared in Preparation Example 3 of the present disclosure was 0.8 wt % of the weight of the biomass-derived graphene; and the mineral elements in the biomass-derived graphene were detected to mainly comprise Si and Fe elements.

Preparation Example 4

Biomass-derived graphene was prepared by the same method as in Preparation Example 1, except that the catalyst used in Step (1) was a mixture of nickel nitrate and cobalt sulfate (at a mass ratio of 3:1), and the biomass carbon source was reed cellulose.

The content of mineral elements in the biomass-derived graphene prepared in Preparation Example 4 of the present disclosure was 6 wt % of the weight of the biomass-derived graphene; and the mineral elements in the biomass-derived graphene were detected to mainly comprise Si, Fe, Na, and K elements.

Example 1

The biomass-derived graphene prepared in Preparation Example 1 was uniformly dispersed in ethylene glycol to prepare a 0.5 mg/mL graphene solution;

a fiber carrier (using cellulose acetate fibers, commercially available in the prior art, with technical indexes comprising: 1.5 D*38 mm, a moisture content of 7% and a fiber strength of 1.5 gram-force) was treated by being boiled in boiling water for 25 min to remove impurities and foreign odors contained in the carrier itself, and dried to obtain an activated and treated fiber carrier;

the treated fiber carrier was immersed in the graphene solution for 10 min, with the immersion comprising: firstly performing ultrasonic treatment, subsequently oscillating, and then leaving to stand; and the fiber carrier was immobilized with anhydrous ethanol, washed and dried to obtain a graphene adsorbing material. The mass of graphene was 1% of the mass of the fiber carrier. That is, the content of graphene was 1 wt % of the weight of the fiber carrier, and the content of the doped element was 0.04 wt % of the fiber carrier.

Example 2

The biomass-derived graphene prepared in Preparation Example 1 was uniformly dispersed in ethylene glycol to prepare a 3 mg/mL graphene solution;

a fiber carrier (the same as that in Example 1) was treated by being boiled in boiling water for 25 min to remove impurities and foreign odors contained in the carrier itself, and dried to obtain an activated and treated fiber carrier;

the treated fiber carrier was immersed in the graphene solution for 60 min, with the immersion comprising: firstly performing ultrasonic treatment, subsequently oscillating, and then leaving to stand; and the fiber carrier was immobilized with anhydrous ethanol, washed and dried to obtain a graphene adsorbing material. The mass of graphene is 4% of the mass of the fiber carrier. That is, the content of graphene was 4 wt % of the weight of the fiber carrier, and the content of the doped element was 0.16 wt % of the weight of the fiber carrier.

Example 3

The biomass-derived graphene prepared in Preparation Example 1 was uniformly dispersed in ethylene glycol to prepare a 1.5 mg/mL graphene solution;

a fiber carrier (the same as that in Example 1) was treated by being boiled in boiling water for 25 min to remove impurities and foreign odors contained in the carrier itself, and dried to obtain an activated and treated fiber carrier;

the treated fiber carrier was immersed in the graphene solution for 25 min, with the immersion comprising: firstly performing ultrasonic treatment, subsequently oscillating, and then leaving to stand; and the fiber carrier was immobilized with anhydrous ethanol, and dried to obtain a graphene adsorbing material. The mass of graphene is 2.5% of the mass of the fiber carrier. That is, the content of graphene was 2.5 wt % of the weight of the fiber carrier, and the content of the doped element was 0.1 wt % of the weight of the fiber carrier.

Example 4

The biomass-derived graphene prepared in Preparation Example 1 was uniformly dispersed in ethylene glycol to prepare a 0.5 mg/mL graphene solution;

a fiber carrier (using cellulose acetate fibers, commercially available in the prior art, with technical indexes comprising: 1.5 D*38 mm, a moisture content of 7% and a fiber strength of 1.5 gram-force) was treated by being boiled in boiling water for 25 min to remove impurities and foreign odors contained in the carrier itself, and dried to obtain an activated and treated fiber carrier;

the treated fiber carrier was immersed in the graphene solution for 10 min, with the immersion comprising: firstly performing ultrasonic treatment, subsequently oscillating, and then leaving to stand; and the fiber carrier was immobilized with anhydrous ethanol, washed and dried to obtain a graphene adsorbing material. The content of graphene was 0.1 wt % of the weight of the fiber carrier, and the content of the doped element was 0.004 wt % of the weight of the fiber carrier.

Example 5

Different from Example 4, a 3 mg/mL graphene solution was prepared; the treated fiber carrier was immersed in the graphene solution for 60 min; and the content of graphene was 10 wt % of the weight of the fiber carrier, and the content of the doped element was 0.4 wt % of the weight of the fiber carrier.

Example 6

Different from Example 4, a 1.5 mg/mL graphene solution was prepared; the treated fiber carrier was immersed in the graphene solution for 25 min; and the content of graphene was 5 wt % of the weight of the fiber carrier, and the content of the doped element was 0.2 wt % of the weight of the fiber carrier.

Example 7

Different from Example 4, the biomass-derived graphene prepared in Preparation Example 2 was used; and the content of the doped element was 0.002 wt % of the weight of the fiber carrier.

Example 8

Different from Example 5, the biomass-derived graphene prepared in Preparation Example 2 was used; and the content of the doped element was 0.2 wt % of the weight of the fiber carrier.

Example 9

Different from Example 6, the biomass-derived graphene prepared in Preparation Example 2 was used; and the content of the doped element was 0.1 wt % of the weight of the fiber carrier.

Example 10

Different from Example 4, the biomass-derived graphene prepared in Preparation Example 3 was used; and the content of the doped element was 0.0008 wt % of the weight of the fiber carrier.

Example 11

Different from Example 5, the biomass-derived graphene prepared in Preparation Example 3 was used; and the content of the doped element was 0.08 wt % of the weight of the fiber carrier.

Example 12

Different from Example 6, the biomass-derived graphene prepared in Preparation Example 3 was used; and the content of the doped element was 0.04 wt % of the weight of the fiber carrier.

Example 13

Different from Example 4, the biomass-derived graphene prepared in Preparation Example 4 was used; and the content of the doped element was 0.006 wt % of the weight of the fiber carrier.

Example 14

Different from Example 5, the biomass-derived graphene prepared in Preparation Example 4 was used; and the content of the doped element was 0.6 wt % of the weight of the fiber carrier.

Example 15

Different from Example 6, the biomass-derived graphene prepared in Preparation Example 4 was used; and the content of the doped element was 0.3 wt % of the weight of the fiber carrier.

Example 16

Compared with Example 6, the biomass-derived graphene was replaced with a mixture of reduced graphene oxide with nano-silicon powder, nano-alumina and a nano-iron material.

Comparative Example 1

Reduced graphene oxide was uniformly dispersed in ethylene glycol to prepare a 0.5 mg/mL graphene solution;

a fiber carrier (using cellulose acetate fibers, commercially available in the prior art, with technical indexes comprising: 1.5 D*38 mm, a moisture content of 7% and a fiber strength of 1.5 gram-force) was treated by being boiled in boiling water for 25 min to remove impurities and foreign odors contained in the carrier itself, and dried to obtain an activated and treated fiber carrier;

the treated fiber carrier was immersed in the graphene solution for 10 min, with the immersion comprising: firstly performing ultrasonic treatment, subsequently oscillating, and then leaving to stand; and the fiber carrier was immobilized with anhydrous ethanol, washed and dried to obtain a graphene adsorbing material. The content of graphene was 5% of the fiber carrier.

Comparative Example 2

Natural graphite was uniformly dispersed into ethylene glycol to prepare a 0.5 mg/mL graphite solution;

a fiber carrier (using cellulose acetate fibers, commercially available in the prior art, with technical indexes comprising: 1.5 D*38 mm, a moisture content of 7% and a fiber strength of 1.5 gram-force) was treated by being boiled in boiling water for 25 min to remove impurities and foreign odors contained in the carrier itself, and dried to obtain an activated and treated fiber carrier;

the treated fiber carrier was immersed in the graphite solution for 10 min, with the immersion comprising: firstly performing ultrasonic treatment, subsequently oscillating, and then leaving to stand; and the fiber carrier was immobilized with anhydrous ethanol, washed and dried to obtain a graphite adsorbing material. The content of graphite was 5% of the fiber carrier.

Comparative Example 3

Bamboo charcoal was uniformly dispersed into ethylene glycol to prepare a 0.5 mg/mL bamboo charcoal solution;

a fiber carrier (using cellulose acetate fibers, commercially available in the prior art, with technical indexes comprising: 1.5 D*38 mm, a moisture content of 7% and a fiber strength of 1.5 gram-force) was treated by being boiled in boiling water for 25 min to remove impurities and foreign odors contained in the carrier itself, and dried to obtain an activated and treated fiber carrier;

the treated fiber carrier was immersed in the bamboo charcoal solution for 10 min, with the immersion comprising: firstly performing ultrasonic treatment, subsequently oscillating, and then leaving to stand; and the fiber carrier was immobilized with anhydrous ethanol, washed and dried to obtain a bamboo charcoal adsorbing material. The content of bamboo charcoal was 5% of the fiber carrier.

Comparative Example 4

The commercially available cellulose acetate fibers were made into an ordinary cigarette filter tip by using a conventional filter-tip making method. A filter element of the cigarette filter tip comprises only a fiber filtration section 3.

The fibrous absorbing materials prepared in Examples 1-16 and Comparative Examples 1-4 were made by a conventional filter-tip making method into cigarette filter tips each having a length of 20 mm (that is, a filter element of the cigarette filter tip comprises only a graphene adsorption section 2). Detection was performed on smoke ingredients of the cigarette filter tips of the above Examples 1-16 and Comparative Examples 1-4 before and after adsorption, which was specifically carried out by the following method:

Cigarette products branded as Taishan (a Chinese cigarette brand) were used, and the cigarette filter tips made in Examples 1-16 and Comparative Examples 1-4 were used as filter tips respectively, which had a length of 20 mm and a circumference of 22~25 mm; before the experiment, the cigarettes were equilibrated with an Artikel-Nr9020-0039 constant-temperature constant-humidity chamber at $(22\pm1)°$ C. and a relative humidity of $(60\pm2)\%$ for 48 hours. The cigarettes to be detected were detected by using a Borgwaltdt-KC smoking machine, wherein each smoking action lasted for 2 seconds and produced a smoke volume of 35 mL, the smoking actions were performed at an interval of 58 seconds at a temperature of $22\pm2°$ C. and a relative humidity of $60\pm5\%$, the smoke was collected, and the collected samples were analyzed by a gas chromatograph-mass spectrometer.

Smoke from the cigarette filter tips made in Examples 1~16 and Comparative Examples 1~4 was evaluated below, and the results were shown in Table 2.

TABLE 2

Results of Evaluation of Smoke from Cigarette Filter Tips of Examples 1~16 and Comparative Examples 1~4

| Examples | Graphene Content wt % | Doped element Content wt % | Total Particulate Matter (mg/cigarette) | Benzopyrene (ng/cigarette) | Nicotine (mg/cigarette) |
|---|---|---|---|---|---|
| 1 | 1 | 0.04 | 8.5 | 4.7 | 0.38 |
| 2 | 4 | 0.16 | 8.3 | 4.5 | 0.35 |
| 3 | 2.5 | 0.1 | 8.3 | 4.4 | 0.35 |
| 4 | 0.1 | 0.004 | 11.3 | 5.5 | 0.4 |
| 5 | 10 | 0.4 | 9.2 | 5.3 | 0.33 |
| 6 | 5 | 0.2 | 8.2 | 4.3 | 0.35 |
| 7 | 0.1 | 0.002 | 11.5 | 5.8 | 0.41 |
| 8 | 10 | 0.2 | 9.7 | 5.5 | 0.34 |
| 9 | 5 | 0.1 | 8.8 | 4.5 | 0.35 |
| 10 | 0.1 | 0.0008 | 12.7 | 6.6 | 0.39 |
| 11 | 10 | 0.08 | 10.3 | 5.8 | 0.36 |
| 12 | 5 | 0.04 | 9.1 | 5.2 | 0.35 |
| 13 | 0.1 | 0.006 | 10.8 | 5.3 | 0.38 |
| 14 | 10 | 0.6 | 9 | 5.1 | 0.35 |
| 15 | 5 | 0.3 | 8 | 4.1 | 0.34 |
| 16 | 5 | 0.2 | 10.3 | 6.1 | 0.36 |
| Comparative Example 1 | 5 | — | 11.7 | 6.5 | 0.37 |
| Comparative Example 2 | Graphite Content 5 wt % | — | 9.5 | 5.7 | 0.11 |

TABLE 2-continued

Results of Evaluation of Smoke from Cigarette Filter Tips of Examples 1~16 and Comparative Examples 1~4

| Examples | Graphene Content wt % | Doped element Content wt % | Total Particulate Matter (mg/cigarette) | Benzopyrene (ng/cigarette) | Nicotine (mg/cigarette) |
|---|---|---|---|---|---|
| Comparative Example 3 | Bamboo Charcoal Content 5 wt % | — | 8.9 | 4.6 | 0.03 |
| Comparative Example 4 | 0 | — | 13.7 | 7 | 0.4 |

The results of Examples 1~16: chromatographic data, finally obtained by analysis of smoke ingredients using a smoking machine and a gas chromatograph-mass spectrometer, showed that after being filtered by the graphene-loaded fibers, the smoke generated by the same mass of cut tobacco has a significant decrease in data of the total particulate matter and benzopyrene, and has no substantial change in data of other ingredients comprising nicotine, etc. Moreover, the feeling of smoking the cigarette is not affected.

It can be seen, by comparing Examples 4, 7 and 10, comparing Examples 5, 8 and 11, and comparing Examples 6, 9 and 12, that in the case of the same graphene content, if the content of the doped element within a certain range is larger, it is more advantageous to the absorption of the total particulate matter and benzopyrene.

The data of Comparative Example 1 showed that nicotine is substantially not absorbed, and the feeling of smoking the cigarette is not affected, but the effect of adsorbing the total particulate matter and benzopyrene is not obvious.

The data of Comparative Examples 2 and 3 showed that the cigarette adsorbing material made by compounding of each of graphite and bamboo charcoal with the fibers has good absorption effect on the nicotine, total particulate matter and benzopyrene, and the feeling of smoking the cigarette is severely affected.

It can be seen from the above examples and comparative examples that the present disclosure in which graphene and doped elements are introduced in the fiber carrier can specifically adsorb and filter out harmful substances like fused polycyclic aromatic hydrocarbons such as benzopyrene from the smoke, and simultaneously retain nicotine and other harmless substances, not affecting the smoking taste of tobacco smoke. The cigarette filter tip provided by the present disclosure can effectively adsorb carcinogenic substances like fused polycyclic aromatic hydrocarbons such as benzopyrene from the smoke to reduce the harm of smoking, without affecting the smoking taste of tobacco smoke and without reducing the pleasure of the smoker.

The applicant states that the process methods of the present disclosure have been illustrated by the above embodiments, but the present disclosure is not limited to the above process steps, that is, it does not mean that the present disclosure must be implemented by the above process steps. It should be understood by those skilled in the art that any of modifications of the disclosure, equivalent replacements of the selected raw materials of the disclosure, addition of auxiliary components, selection of specific methods, and the like would fall within the scope of protection and the disclosure of the present invention.

The invention claimed is:

1. A graphene adsorbing material, comprising:
a fiber carrier; and
graphene and a doped element which are loaded on the fiber carrier, the doped element comprising at least one of Al and Si, wherein the graphene is biomass-derived graphene, the doped element is present in form of simple substances and/or compounds, and the doped element is adsorbed onto the surface of the biomass-derived graphene.

2. The graphene adsorbing material according to claim 1, wherein the graphene and the doped element are introduced by biomass-derived graphene.

3. The graphene adsorbing material according to claim 1, wherein the fiber carrier comprises at least one of natural fibers, semi-synthetic fibers and synthetic fibers.

4. The graphene adsorbing material according to claim 1, wherein a content of the graphene is 0.1-10 wt % of weight of the fiber carrier.

5. The graphene adsorbing material according to claim 1, wherein the graphene has a porous structure with a porosity of 2%-10%.

6. The graphene adsorbing material according to claim 1, wherein a content of the doped element is 0.002-1 wt % of weight of the fiber carrier.

7. The graphene adsorbing material according to claim 1, wherein the doped element further comprises at least one of K, Na, Ca, Mg, P, Mn, and Co.

8. A method of preparing the graphene adsorbing material according to claim 1, comprising steps of:
bringing fibers into contact with a graphene material, so that the graphene material is loaded on the fibers, thereby obtaining the graphene adsorbing material, wherein the graphene material comprises graphene and the doped element, the doped element comprising at least one of Al and Si, wherein the graphene is biomass-derived graphene, the doped element is present in form of simple substances and/or compounds, and the doped element is adsorbed onto the surface of the biomass-derived graphene.

9. The method of preparing the graphene adsorbing material according to claim 8, wherein the graphene and the doped element are introduced by biomass-derived graphene.

10. The method of preparing the graphene adsorbing material according to claim 8, wherein the fiber carrier comprises at least one of natural fibers, semi-synthetic fibers and synthetic fibers.

11. The method of preparing the graphene adsorbing material according to claim 8, wherein a content of the graphene is 0.1-10 wt % of weight of the fiber carrier.

12. The method of preparing the graphene adsorbing material according to claim 8, wherein the graphene has a porous structure with a porosity of 2%-10%.

13. The method of preparing the graphene adsorbing material according to claim 8, wherein a content of the doped element is 0.002- 1 wt % of weight of the fiber carrier.

14. The method of preparing the graphene adsorbing material according to claim 8, wherein the doped element further comprises at least one of K, Na, Ca, Mg, P, Mn, and Co.

15. The preparation method method of preparing the graphene adsorbing material according to claim 8, comprising steps of:
dispersing the graphene material in a solvent to prepare a graphene solution, wherein the graphene material is introduced by biomass-derived graphene, the solvent comprising at least one of ethylene glycol, dimethylformamide, N-methylpyrrolidone, ethanol and water, wherein a coupling agent is further dissolved in the graphene solution, and the coupling agent comprising at least one of a silane coupling agent, a titanate coupling agent, and a zirconium-based coupling agent, and an amount of the coupling agent used is 1%-10% of an amount of the graphene; and
immersing the fibers in the graphene solution for 10-60 min, and washing and drying the fibers to obtain the graphene adsorbing material.

\* \* \* \* \*